United States Patent
Landa et al.

(10) Patent No.: US 6,953,759 B2
(45) Date of Patent: Oct. 11, 2005

(54) GLASS COMPOSITION WITH LOW VISIBLE AND IR TRANSMISSION

(75) Inventors: Ksenia A. Landa, Grosse elle, MI (US); Leonid Landa, Grosse lle, MI (US); Richard Hulme, Rochester Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 116 days.

(21) Appl. No.: 10/227,530

(22) Filed: Aug. 26, 2002

(65) Prior Publication Data

US 2004/0038799 A1 Feb. 26, 2004

(51) Int. Cl.$^7$ ............................................. C03C 3/087
(52) U.S. Cl. ............................ 501/71; 501/70; 501/904; 501/905
(58) Field of Search ............................ 501/70, 71, 904, 501/905

(56) References Cited

U.S. PATENT DOCUMENTS

| | | | |
|---|---|---|---|
| 5,023,210 A | 6/1991 | Krumwiede et al. | |
| 5,214,008 A | 5/1993 | Beckwith et al. | |
| 5,258,336 A | 11/1993 | LaMastro et al. | |
| 5,264,400 A | 11/1993 | Nakaguchi et al. | |
| 5,308,805 A | 5/1994 | Baker et al. | |
| 5,318,931 A | 6/1994 | Nakaguchi et al. | |
| 5,346,867 A | 9/1994 | Jones et al. | |
| 5,411,922 A | 5/1995 | Jones | |
| 5,569,630 A | 10/1996 | Landa et al. | |
| 5,650,365 A * | 7/1997 | Higby et al. | 501/71 |
| 5,726,109 A * | 3/1998 | Ito et al. | 501/71 |
| 5,780,372 A * | 7/1998 | Higby | 501/70 |
| 5,807,417 A * | 9/1998 | Boulos et al. | 65/134.3 |
| 5,837,629 A | 11/1998 | Combes et al. | |
| 5,851,940 A * | 12/1998 | Boulos et al. | 501/71 |
| 5,905,047 A * | 5/1999 | Sasage et al. | 501/71 |
| 5,932,502 A | 8/1999 | Longobardo et al. | |
| 5,952,255 A * | 9/1999 | Seto et al. | 501/71 |
| 5,962,356 A * | 10/1999 | Boulos et al. | 501/70 |
| 5,998,316 A * | 12/1999 | Seto et al. | 501/71 |
| 6,071,840 A * | 6/2000 | Sasage et al. | 501/71 |
| 6,080,694 A * | 6/2000 | Boulos et al. | 501/70 |
| 6,080,695 A | 6/2000 | Scheffler-Hudlet et al. | |
| 6,103,650 A | 8/2000 | Krumwiede | |
| 6,114,264 A | 9/2000 | Krumwiedge et al. | |
| RE37,328 E | 8/2001 | Pecoraro et al. | |
| 6,274,523 B1 * | 8/2001 | Krumwiede et al. | 501/71 |
| 6,287,998 B1 | 9/2001 | Seto et al. | |
| 6,333,287 B1 * | 12/2001 | Seto | 501/70 |
| RE37,514 E | 1/2002 | Sasage et al. | |
| 6,395,660 B1 * | 5/2002 | Seto et al. | 501/71 |
| 6,403,509 B2 | 6/2002 | Cochran et al. | |
| 6,408,650 B1 * | 6/2002 | Boulos et al. | 65/134.3 |
| 6,413,893 B1 | 7/2002 | Shelestak et al. | |
| 6,436,860 B2 * | 8/2002 | Seto et al. | 501/71 |
| 6,455,452 B1 * | 9/2002 | Krumwiede | 501/71 |
| 6,524,713 B2 * | 2/2003 | Seto et al. | 428/426 |
| 2001/0025002 A1 * | 9/2001 | Krumwiede et al. | 501/64 |
| 2001/0025004 A1 * | 9/2001 | Seto et al. | 501/904 |
| 2002/0058579 A1 | 5/2002 | Seto et al. | |
| 2002/0155939 A1 * | 10/2002 | Seto et al. | 501/71 |
| 2003/0050175 A1 * | 3/2003 | Seto et al. | 501/71 |
| 2003/0083188 A1 * | 5/2003 | Seto et al. | 501/71 |

FOREIGN PATENT DOCUMENTS

| | | |
|---|---|---|
| EP | 0 803 479 | 10/1997 |
| EP | 1 013 620 | 6/2000 |
| EP | 1 125 899 | 8/2001 |
| WO | WO 99/58462 | 11/1999 |
| WO | WO 02/05902 | 8/2002 |

OTHER PUBLICATIONS

Patent Abstracts of Japan; 08245238, Sep. 1996, "Low Transmission Glass".

International Search Report dated Oct. 5, 2004.

* cited by examiner

*Primary Examiner*—Karl Group
*Assistant Examiner*—Elizabeth A. Bolden
(74) *Attorney, Agent, or Firm*—Nixon & Vanderhye P.C.

(57) ABSTRACT

A glass having a visible transmission of no greater than 28% and low IR transmission, and employing a colorant portion:

| | |
|---|---|
| total iron (expressed as $Fe_2O_3$): | 0.7 to 1.8% |
| cobalt oxide (e.g., $Co_3O_4$): | 0.001 to 1.0% |
| titanium oxide (e.g., $TiO_2$): | 0.25 to 3.0% |
| selenium (e.g., Se): | 0 to 0.0020% |
| chromium oxide (e.g., $Cr_2O_3$): | 0 to 0.010%. |

24 Claims, No Drawings

GLASS COMPOSITION WITH LOW VISIBLE AND IR TRANSMISSION

This invention relates to glass compositions and methods of making the same. More particularly, this invention relates to glass having a low visible transmission (e.g., no greater than about 28%) and a low IR transmission (e.g., no greater than about 7%). In certain example embodiments, the glass may include iron, cobalt (Co) and titanium (Ti) as colorants. Such glass (e.g., green or grey in color) is useful, for example, as low transmission privacy glass in the context of windows in the automotive industry and/or in architectural applications.

BACKGROUND OF THE INVENTION

Commercial use of "privacy" window in automobiles and/or architectural applications has become more popular over the years. Such glasses are sometimes formed from a standard soda-lime-silica glass composition to which is added various colorants designed to achieve desired color and spectral properties. Desired spectral properties include low visible light transmission, low infrared (IR) transmission, and/or low ultraviolet (UV) transmission, with these terms being defined as follows:

Lta as visible light transmission,
UV as ultraviolet light transmission, and
IR as infrared light transmission.

One conventional privacy glass is known as "Venus 10." Venus 10 is believed to have the following colorant portion and spectral characteristics at a thickness of about 4 mm:

| INGREDIENT/SPECTRAL | AMOUNT/VALUE |
|---|---|
| total iron: | 2.693% (wt. %) |
| cobalt oxide: | 0.0277% (wt. %) |
| chromium oxide: | 0.0012% (wt. %) |
| Lta | 10.24% |
| % UV | 1.35% |
| % IR | 1.76 |
| % FeO | 0.9243 |
| Dom. λ | 490 |
| Ex. Purity, % | 22.07 |
| L* (D65) | 40.57 |
| a* | −15.6 |
| b* | −4.49 |

While Venus 10 has good color and visible/IR transmission characteristics, it is problematic in that it requires too much total iron (total iron herein is referred to as $Fe_2O_3$), namely about 2.693%. This high amount of total iron is undesirable in that it typically requires a special shallow tank to be used for melting the same (a high amount of total iron is difficult to efficiently melt during the process of glass manufacture on a consistent basis).

In view of the above, it is apparent that there exists a need in the art for a new glass composition and/or method of making the same which enables low visible and/or IR transmission characteristics to be achieved without needing an undesirably large amount of total iron.

U.S. Pat. No. Re 37,328 to Pecoraro et al. discloses an IR absorbing glass including iron and cerium in certain examples. Unfortunately, the glass of the '328 patent has a much too high visible transmission of at least about 64%.

U.S. Pat. No. 5,411,922 to Jones discloses a neutral gray-green low transmittance glass which includes iron, cobalt, selenium and titanium. Unfortunately, the example glasses of the '922 patent have a rather high IR transmission.

U.S. Pat. No. 6,413,893 to Shelestak discloses a green privacy glass including iron, chromium, cobalt, selenium and titanium. Unfortunately, most examples glass of the '893 patent require large amounts of chromium (e.g., $Cr_2O_3$). For instance, example nos. 1–85 of the '893 patent require at least 0.0210% $Cr_2O_3$. Such large amounts of chromium are often undesirable because Cr defects can result in the final glass product. Meanwhile, in examples of the '893 patent where lower amounts of chromium are used, the glass is problematic in that IR transmission is too high (e.g., see example nos. 86, 89, 194, 195 and 255).

U.S. Pat. No. 5,023,210 discloses a low transmittance grey glass including iron, chromium, selenium and cobalt. Again, the glass of the '210 patent is problematic in that too much Cr is used, which is undesirable for the reasons discussed above.

In view of the above, it is apparent that there exists a need in the art for a new glass composition which overcomes the above problems while achieving low visible and/or IR transmission properties.

SUMMARY OF THE INVENTION

An object of this invention is to provide a glass (and method of making the same) which has low visible and/or IR transmission, and which does not require too much total iron and/or chromium in order to achieve such low transmission.

In certain example non-limiting embodiments, a low transmission glass is achieved without the need for too much iron or chromium by using cobalt and titanium in combination with iron in order to achieve desired spectral characteristics, and by introducing the iron into the glass batch during the melt process at least partially (or alternatively entirely) in the form of melite. When iron is introduced into the batch in the form of melite, much of the iron is already in reduced form; as a result, a desired $FeO/Fe_2O_3$ balance can be achieved and/or maintained during the melt and the desired spectral characteristics (e.g., iron and/or low transmission) can be achieved without the need for additional iron and/or large amounts of reducing agent(s).

Generally speaking, certain example embodiments of this invention fulfill one or more of the above-listed need(s) and/or object(s) by providing a glass having a visible transmission of no greater than 28% and an infrared (IR) transmission of no greater than 7%, wherein the glass includes a colorant portion comprising, in terms of weight %:

| total iron: | 0.7 to 1.8% |
|---|---|
| cobalt oxide: | 0.001 to 1.0% |
| titanium oxide: | 0.25 to 3.0% |
| chromium oxide: | 0 to 0.010%. |

In other example embodiments of this invention, one or more of the above-listed need(s) and/or object(s) is fulfilled by providing a glass comprising:

a base glass portion comprising:

| Ingredient | Wt. % |
|---|---|
| $SiO_2$ | 67–75% |
| $Na_2O$ | 10–20% |
| CaO | 5–15% |

-continued

| Ingredient | Wt. % |
|---|---|
| MgO | 0–6% |
| $Al_2O_3$ | 0–5% |
| $K_2O$ | 0–5% |
| BaO | 0–1% | and a colorant portion either comprising or consisting essentially of:

| | |
|---|---|
| total iron: | 0.7 to 1.8% |
| cobalt oxide: | 0.001 to 1.0% |
| titanium oxide: | 0.25 to 3.0% |
| selenium: | 0 to 0.0020% |
| chromium oxide: | 0 to 0.010% | wherein the glass has a visible transmission (Lta) no greater than 28% and an IR transmission no greater than 7%.

DETAILED DESCRIPTION OF CERTAIN EXAMPLE EMBODIMENTS OF THIS INVENTION

Glasses according to different embodiments of this invention may be used, for example, as privacy glass in the automotive industry (e.g., backlites, side windows, etc.), in architectural applications, and/or in other suitable applications. Such glasses may be green, grey, or otherwise colored in different embodiments of this invention.

Certain glasses according to this invention utilize soda-lime-silica glass as their base composition/glass, to which is added certain ingredients making up a unique colorant portion. An exemplary soda-lime-silica base glass according to certain embodiments of this invention, on a weight percentage basis, includes the following basic ingredients:

TABLE 1

Example Base Glass

| INGREDIENT | Wt. % |
|---|---|
| $SiO_2$ | 67–75% |
| $Na_2O$ | 10–20% |
| CaO | 5–15% |
| MgO | 0–6% |
| $Al_2O_3$ | 0–5% |
| $K_2O$ | 0–5% |
| BaO | 0–1% |

Other minor ingredients, including various conventional and refining aids, such as $SO_3$, carbon, gypsum, $CaSO_4$ and the like may also be included in the base glass. In certain embodiments, for example, glass herein may be made from batch raw materials silica sand, soda ash (or NaOH as a soda source), dolomite, limestone, with the use of salt cake ($SO_3$) and/or Epsom salts (e.g., about a 1:1 combination of both) as refining agents. Reducing agent(s) such as Si (metallic), Si, silicon monoxide, SiO, sucrose, and/or carbon may also be used. Preferably, soda-lime-silica base glasses herein include by weight from about 10–15% $Na_2O$ and from about 6–12% CaO. While a soda-lime-silica base glass set forth above is preferred in certain embodiments of this invention, this invention is not so limited. Thus, other base glasses may instead be employed in alternative embodiments.

To the base glass (e.g., see example in Table 1 above), the instant invention adds a colorant portion which may cause the resulting glass to have low visible and/or IR transmission characteristics, while enabling the glass to be made in an efficient manner without the need for too much iron and/or chromium.

In certain example embodiments of this invention, an exemplary colorant portion that is added to the base glass is substantially free of cerium, selenium, and/or nickel (i.e., no more than 0.0030% Ce, CeO, and/or $CeO_2$; no more than 0.0010% Se; and/or no more than 0.0010% Ni and/or NiO), and is characterized in final glasses as set forth in Table 2 below (in terms of weight percentage of the total glass composition). The colorant portion of certain example embodiments of this invention may consist essentially of, or comprise, the element listed in Table 2 below:

TABLE 2

Example Colorant Portion

| INGREDIENT | General (Wt. %) | Preferred (Wt. %) | Best (Wt. %) |
|---|---|---|---|
| total iron (expressed as $Fe_2O_3$): | 0.7 to 1.8% | 0.9 to 1.5% | 1.1 to 1.3% |
| cobalt oxide (e.g., $Co_3O_4$): | 0.001 to 1.0% | 0.01 to 0.20% | 0.015 to 0.10% |
| titanium oxide (e.g., $TiO_2$): | 0.25 to 3.0% | 0.4 to 2.5% | 1.0 to 2.0% |
| selenium (Se): | 0 to 0.0020% | 0 to 0.0010% | 0 to 0.0001% |
| chromium oxide (e.g., $Cr_2O_3$): | 0 to 0.010% | 0 to 0.0010% | 0 to 0.0001% |

It should be appreciated that small amounts of other materials (e.g., refining aids, melting aids, and/or impurities) may be present in the glass such as manganese, molybdenum, tin, chlorine, zinc, zirconium, Si, sulfate, fluorine, lithium and strontium, without taking away from the purpose(s) and/or goal(s) of the instant invention. It is also noted that up to about 2.0% total iron may be used in certain embodiments of this invention.

The total amount of iron present in the glass and in the colorant portion thereof is expressed herein in terms of $Fe_2O_3$ in accordance with standard practice. This, however, does not imply that all iron is actually in the from of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass, and is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a redox value (i.e., $FeO/Fe_2O_3$) of from 0.10 to 0.75, more preferably from 0.40 to 0.75.

The aforesaid colorants may be added to the glass batch in any suitable manner. However, in certain example embodiments of this invention the iron is added in the form of melite (as opposed to rouge). Melite in certain example embodiments may consist essentially of about 48–52% $SiO_2$ (e.g., 50%), about 17–21% $Al_2O_3$ (e.g., 19%), about 19–22% total iron (e.g., 21%) with about 75–85% of the iron being in reduced form (FeO), about 3–5% CaO (e.g., 4%), about 0–3% MgO (e.g., 1%), and about 0–3% (Na, K)O. However, unless expressly stated otherwise, the term "melite" as used herein means a mixture of at least iron, CaO, $Al_2O_3$, and $SiO_2$ where the iron makes up at least about 15% of the mixture. When iron is introduced into the batch in the form of melite, much of the iron is already in reduced form (FeO). As a result, a desired $FeO/Fe_2O_3$ balance can be achieved and/or maintained during the melt and the desired spectral characteristics (e.g., low transmission) can be achieved without the need for additional iron and/or without the need for large amounts of reducing agent(s).

Moreover, it is noted that glasses according to this invention may be made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

Glasses of this invention, as stated above, may in certain example non-limiting embodiments achieve the following color/solar characteristics characterized by low visible and/or IR transmission, and/or green or grey color (see Table 3 below). Other colors are possible in other embodiments of this invention. In certain embodiments, glasses herein include one or more of the following color/solar characteristics when measured at a nominal thickness of from about 1 mm–6 mm (and preferably for most uses, at about 3 mm–4 mm, wherein 4 mm may be used for a reference but non-limiting thickness in certain instances):

TABLE 3

Example Transmissive Color/Solar Characteristics

| CHARACTERISTIC | General | More Preferred | Most Preferred |
|---|---|---|---|
| Lta (visible transmittance): | <=28% | <=25% | <=20% |
| $IR_{transmission}$ (% IR): | <=7% | <=5% | <=3% |
| $UV_{transmission}$ (% UV): | <=15% | <=10% | <=7% |
| Dominant λ: | 450–530 nm | 470–510 nm | 480–500 nm |
| Ex. Purity, % (Pe): | 6–30 | 10–25 | 15–25 |
| L* (Ill. D65, 10 deg. observer): | 30–75 | 40–70 | 45–65 |
| a* (Ill. D65, 10 deg. observer): | −26.0 to −5.0 | −24.0 to −10.0 | −22.0 to −15.0 |
| b* (Ill. D65, 10 deg. observer): | −12.0 to +2.0 | −10.0 to 0.0 | −8.0 to −1.0 |
| % FeO: | >=0.25 | >=0.35 | >=0.50 |

Glasses of certain embodiments of this invention achieve the above unique characteristics (i.e., desired color and/or solar management properties such as low Lta and % IR) through the use of the unique colorant portions discussed herein, and/or the introduction of iron into the glass batch in the form of at least melite as opposed to only rouge. Certain example embodiments of the instant invention use the combination of Co and Ti, along with iron, to achieve the desired coloration in the green or grey region of the spectrum. Moreover, the unique combination of at least iron, cobalt and/or titanium as used herein enables the low visible and IR transmissions to be achieved, along with desired coloration, without the need for significant amounts of $Cr_2O_3$, or too much iron.

Cobalt (Co) is a blue colorant. It is believed that much of the cobalt in the glass is in the oxide state of $Co_3O_4$. However, other oxide states of CoO are also possible in glasses according to this invention. Thus, unless expressly stated to the contrary, the terms cobalt oxide, CoO and $Co_3O_4$ as used herein include not only cobalt in this/these particular oxide state(s), but also include(s) cobalt which may be present in other oxide or non-oxide state(s).

Titanium (Ti) is a UV absorber which may operate as a colorant imparting a yellowish color to the glass. It is believed that much of the titanium in the glass is in the oxide state of $TiO_2$. However, other oxide states are also possible in glasses according to this invention. Thus, unless expressly stated to the contrary, the terms titanium oxide and $TiO_2$ as used herein include not only titanium in this particular oxide state, but also include(s) titanium which may be present in other oxide or non-oxide state(s).

With regard to Se, in certain embodiments Se may be introduced into the glass batch in amounts of, for example, from 0–25 ppm. In order to increase retention of Se and to improve homogeneity of the glass through a more uniform Se distribution in the melt, compositions of this invention may use various sources of Se, such as sodium and/or calcium selenites, iron and/or cobalt selenides, and/or metallic Se powder. Moreover, while Se often combines with iron as iron selenide (FeSe) in glass to produce brown color, and does so in certain embodiments of this invention, selenium is referred to in the colorant portion herein as "Se" which is meant to include, for example, its state as Se as well as other states in glass such as FeSe. While Se may or may not be used in the colorant portion as discussed above, it is noted that in many embodiments Se need not be present or need only be present in trace amounts.

EXAMPLES 1–5

The glasses of this invention may be made from batch ingredients using well known glass melting and refining techniques. For example, in a conventional batch technique for melting, the following base glass batch was used for the Examples herein (note: the below-listed ingredients in the batch will add up to 100% by weight once oxides thereof are accounted for; thus, they need not add up to one hundred as raw materials). It is noted that while Epsom was used in Examples 1–3 and 5 as a refiner, it was replaced with saltcake in Example 4.

TABLE 4

Base Glass for Examples 1–5

| Batch Ingredient for Base Glass | Parts by Wt. |
|---|---|
| sand | 71.5 |
| soda ash | 23.7 |
| dolomite | 18.32 |
| limestone | 6.1 |
| Epsom salt (or saltcake) | 0.9 |
| Sucrose | 0.3 |

In addition to the base glass materials above, the colorant portions for Examples 1–5 herein were as follows (wt. % of total glass) in amounts added to the base batch:

TABLE 5

Colorant Portions for Examples 1–5

| Compound/Element | Ex. 1 | Ex. 2 | Ex. 3 | Ex. 4 | Ex. 5 |
|---|---|---|---|---|---|
| total iron ($Fe_2O_3$): | 1.12 | 1.12 | 1.26 | 1.2 | 1.26 |
| as melite | 6.19 | 6.19 | 6.5 | 6.45 | 6.5 |
| cobalt oxide ($Co_3O_4$): | 0.026 | 0.026 | 0.027 | 0.026 | 0.027 |
| titanium oxide ($TiO_2$): | 1.4 | 1.4 | 1.6 | 1.45 | 1.4 |

The elements in Table 5 above are believed to have substantially remained in the final glasses of Examples 1–5. Solar characteristics for Examples 1–5 were as follows, where Lta, a*, b*, and L* were transmissive (a*, b* and L* data were taken via Ill. D65, 10 deg. observer):

TABLE 6

Solar Characteristics of Examples 1–5

| | Ex. 1 | Ex. 2 | Ex. 3 | Ex. 4 | Ex. 5 |
|---|---|---|---|---|---|
| Thickness (mm): | 4 | 4 | 4 | 4 | 4 |
| % Lta: | 19.5 | 19.56 | 18.04 | 25.32 | 20.86 |
| % IR: | 2 | 1.86 | 2.25 | 7.62 | 3.94 |
| % UV: | 5.85 | 6.5 | 5.08 | 8.8 | 7.36 |
| % TS: | 10.34 | 10.41 | 9.98 | 16.91 | 12.49 |
| % FeO: | 0.9541 | 0.8412 | 0.569 | 0.396 | 0.494 |
| Y (Ltc): | 21.47 | 21.51 | 20.67 | 27.31 | 22.81 |
| x | 0.258 | 0.255 | 0.262 | 0.263 | 0.256 |
| y | 0.314 | 0.310 | 0.323 | 0.303 | 0.303 |
| L* | 53.87 | 53.95 | 52.91 | 59.7 | 55.34 |
| a* | −17.52 | −17.46 | −17.73 | −13.77 | −15.56 |
| b* | −4.63 | −5.83 | −2.18 | −7.35 | −7.46 |
| Dominant λ: | 490 | 489 | 493 | 488 | 488 |
| Ex. Purity, % (Pe): | 19.81 | 21.07 | 17.18 | 18.53 | 21.12 |

In manufacturing the glasses of Examples 1–5 above, the base glass batch material together with the colorant portion was melted. Thereafter, it was annealed at about 620 degrees C. for half an hour, and then allowed to cool down to room temperature. The example glasses (i.e., samples) were then polished to the desired thickness and spectral measurements above were taken to determine the light transmittance in the wavelength range from 250 to 2,000 nm. The results are set forth in the tables above.

It is noted that luminous transmittance (Lta) [2 degree observer] is understood in the art, and is used herein in accordance with its known meaning. This term is also known as Ill. A visible transmittance (380–780 nanometers inclusive), and its measurements are made in accordance with CIE Publication 15.2 (1986)) and ASTM E308. The terms, and characteristics, of ultraviolet light transmittance (% UV), infrared energy transmittance (% IR), dominant wavelength (λ), total solar energy transmittance (% TS), and excitation purity (i.e. % "purity", or Pe) are also well understood terms in the art, as are their measurement techniques. Such terms are used herein, in accordance with their well known meaning, e.g., see U.S. Pat. No. 5,308,805. In particular, ultraviolet transmittance (% UV) is measured herein using Parry Moon Air Mass=2 (300–400 nm inclusive, integrated using Simpson's Rule at 10 nm intervals). IR transmittance is conventionally measured using Simpson's Rule and Parry Moon Air Mass=2 over the wavelength range 800–2100 nm inclusive at 50 nm intervals. Dominant wavelength (DW) is calculated and measured conventionally in accord with the aforesaid CIE Publication 15.2 (1986) and ASTM: E 308–90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308–90.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A green/grey glass comprising:
a base glass portion comprising:

| Ingredient | Wt. % |
|---|---|
| $SiO_2$ | 67–75% |
| $Na_2O$ | 10–20% |
| CaO | 5–15% |
| MgO | 0–6% |
| $Al_2O_3$ | 0–5% |
| $K_2O$ | 0–5% |
| BaO | 0–1% | and a colorant portion consisting essentially of:

| | |
|---|---|
| total iron: | 0.7 to 1.8% |
| cobalt oxide: | 0.001 to 1.0% |
| titanium oxide: | 0.25 to 3.0% |
| selenium: | 0 to 0.0020% |
| chromium oxide: | 0 to 0.010% | wherein the glass is green or grey in color and at a reference thickness of 4 mm has a visible transmission (Lta) no greater than 28%, an excitation purity of from 10–25%, and an IR transmission no greater than 7%, and wherein the glass has a % FeO of at least 0.50 and a glass redox of from 0.4 to 0.75.

2. The glass of claim 1, wherein the glass has a dominant wavelength of from 450 to 530 nm.

3. The glass of claim 2, wherein the glass has from 0 to 0.001% chromium oxide.

4. The glass of claim 1, wherein the glass is substantially free of cerium.

5. The glass of claim 1, wherein the glass is substantially free of nickel.

6. The glass of claim 1, wherein the glass has a visible transmission (Lta) no greater than 25% and an IR transmission no greater than 5%.

7. The glass of claim 1, wherein the glass has a visible transmission (Lta) no greater than 20% and an IR transmission no greater than 5%.

8. The glass of claim 1, wherein the colorant portion consists essentially of:

| Ingredient | Wt. % |
| --- | --- |
| total iron: | 0.9 to 1.5% |
| cobalt oxide: | 0.01 to 0.20% |
| titanium oxide: | 0.4 to 2.5% |
| selenium: | 0 to 0.0010% |
| chromium oxide: | 0 to 0.010%. |

9. A green/grey glass comprising:
a base glass portion comprising:

| Ingredient | Wt. % |
| --- | --- |
| $SiO_2$ | 67–75% |
| $Na_2O$ | 10–20% |
| CaO | 5–15% |
| $Al_2O_3$ | 0–5% |
| $K_2O$ | 0–5% | and a colorant portion comprising:

| Ingredient | Wt. % |
| --- | --- |
| total iron: | 0.9 to 1.5% |
| cobalt oxide: | 0.001 to 1.0% |
| titanium oxide: | 0.25 to 3.0% |
| selenium: | 0 to 0.0020% |
| chromium oxide: | 0 to 0.010% | wherein the glass is green and/or grey in color and at a reference thickness of 4 mm has a visible transmission (Lta) no greater than 28% and an IR transmission no greater than 7%, and wherein the glass has a % FeO of at least 0.50 and a glass redox of from 0.4 to 0.75.

10. The glass of claim 9, wherein the colorant portion comprises:

| Ingredient | Wt. % |
| --- | --- |
| total iron: | 0.9 to 1.5% |
| cobalt oxide: | 0.01 to 0.20% |
| titanium oxide: | 0.4 to 2.5% |
| selenium: | 0 to 0.0010% |
| chromium oxide: | 0 to 0.010%. |

11. The glass of claim 9, wherein the glass has a dominant wavelength of from 450 to 530 nm.

12. The glass of claim 9, wherein the glass has a visible transmission (Lta) no greater than 25% and an IR transmission no greater than 5%.

13. The glass of claim 9, wherein the glass has an IR transmission of no greater than 5%.

14. The glass of claim 9, wherein the glass has a visible transmission of no greater than 20%, an IR transmission of no greater than 3%, and a UV transmission of no greater than 10%.

15. The glass of claim 9, wherein the glass has a visible transmission of no greater than 20%, an IR transmission of no greater than 5%, and a total solar (TS) transmission of no greater than 15%.

16. A green and/or grey colored glass having, at a reference thickness of 4 mm, a visible transmission of no greater than 28% and an infrared (IR) transmission of no greater than 7%, wherein the green and/or grey colored glass includes a colorant portion comprising:

| Ingredient | Wt. % |
| --- | --- |
| total iron: | 0.9 to 1.5% |
| cobalt oxide: | 0.001 to 1.0% |
| titanium oxide: | 0.25 to 3.0% |
| chromium oxide: | 0 to 0.010% | wherein the glass has a % FeO of at least 0.50, and a glass redox of from 0.4 to 0.75.

17. The glass of claim 16, wherein the glass has a dominant wavelength of from 450 to 530 nm, and an Excitation Purity (Pe) of from 6–30%.

18. The glass of claim 16, wherein the glass is green in color.

19. The glass of claim 16, wherein the colorant portion comprises:

| Ingredient | Wt. % |
| --- | --- |
| total iron: | 0.9 to 1.5% |
| cobalt oxide: | 0.01 to 0.20% |
| titanium oxide: | 0.4 to 2.5% |
| selenium: | 0 to 0.0010% |
| chromium oxide: | 0 to 0.010%. |

20. The glass of claim 16, wherein the glass has a visible transmission (Lta) no greater than 20%, an IR transmission of no greater than 5%, and a UV transmission no greater than 15%.

21. The glass of claim 16, wherein the glass is substantially free of cerium and nickel.

22. The glass of claim 16, wherein the glass is substantially free of selenium and nickel.

23. A green/grey glass comprising:
a base glass portion comprising:

| Ingredient | Wt. % |
| --- | --- |
| $SiO_2$ | 67–75% |
| $Na_2O$ | 10–20% |
| CaO | 5–15% |
| $Al_2O_3$ | 0–5% |
| $K_2O$ | 0–5% | and a colorant portion comprising:

| Ingredient | Wt. % |
| --- | --- |
| total iron: | 0.7 to 1.5% |
| % FeO: | ≥0.50% |
| cobalt oxide: | 0.001 to 1.0% |
| titanium oxide: | 0.25 to 3.0% |
| chromium oxide: | 0 to 0.010% |
| glass redox: | 0.40 to 0.75 | wherein the glass is green and/or grey in color and at a reference thickness of 4 mm has a visible transmission (Lta) no greater than 28% and an IR transmission no greater than 7%.

24. The glass of claim 23, wherein the glass is green in color and has an excitation purity (Pe) of from 10 to 25.

* * * * *